United States Patent [19]
Johnson

[11] Patent Number: 5,193,300
[45] Date of Patent: Mar. 16, 1993

[54] TRIPANEL HYDRODYNAMIC DEPRESSOR FOR FISHING LINES

[76] Inventor: Robert G. Johnson, P.O. Box 540, Seaview, Wash. 98644

[21] Appl. No.: 877,676

[22] Filed: May 1, 1992

[51] Int. Cl.$^5$ .............................................. A01K 95/00
[52] U.S. Cl. ..................................... 43/43.13; 43/9.7
[58] Field of Search ............................... 43/43.13, 9.7

[56] References Cited

U.S. PATENT DOCUMENTS

| | | | |
|---|---|---|---|
| 3,466,787 | 9/1969 | Collins | 43/43.13 |
| 3,831,308 | 8/1974 | Shaw | 43/43.13 |
| 4,161,841 | 7/1979 | Holstein | 43/43.13 |
| 4,492,054 | 1/1985 | Barnhart | 43/42.22 X |
| 4,854,071 | 8/1989 | Kendall | 43/42.32 X |

Primary Examiner—Richard K. Seidel
Attorney, Agent, or Firm—Robert W. Beach

[57] ABSTRACT

The plate body of a hydrodynamic depressor is composed of a flat central panel flanked along its opposite longitudinal edges by side panels disposed at dihedral angles to the central panel. The central panel carries a guide rod extending fore and aft along which a ring connected to a fishing line slides, and ribs are engageable by the guide rod to deter displacement of the connecting ring from a rearward position to a forward position or vice versa. A housing carried by the forward portion of the body has a cylindrical crossbore receiving a cylindrical weight that can be shifted transversely of the fishing line guide rod to trim the depressor for traveling along a course offset to port or starboard from the course of the leading end of the fishing line. The upper and lower surfaces of the side panels are crinkled or rippled to form light-reflecting surfaces producing a glitter for attracting fish.

7 Claims, 4 Drawing Sheets

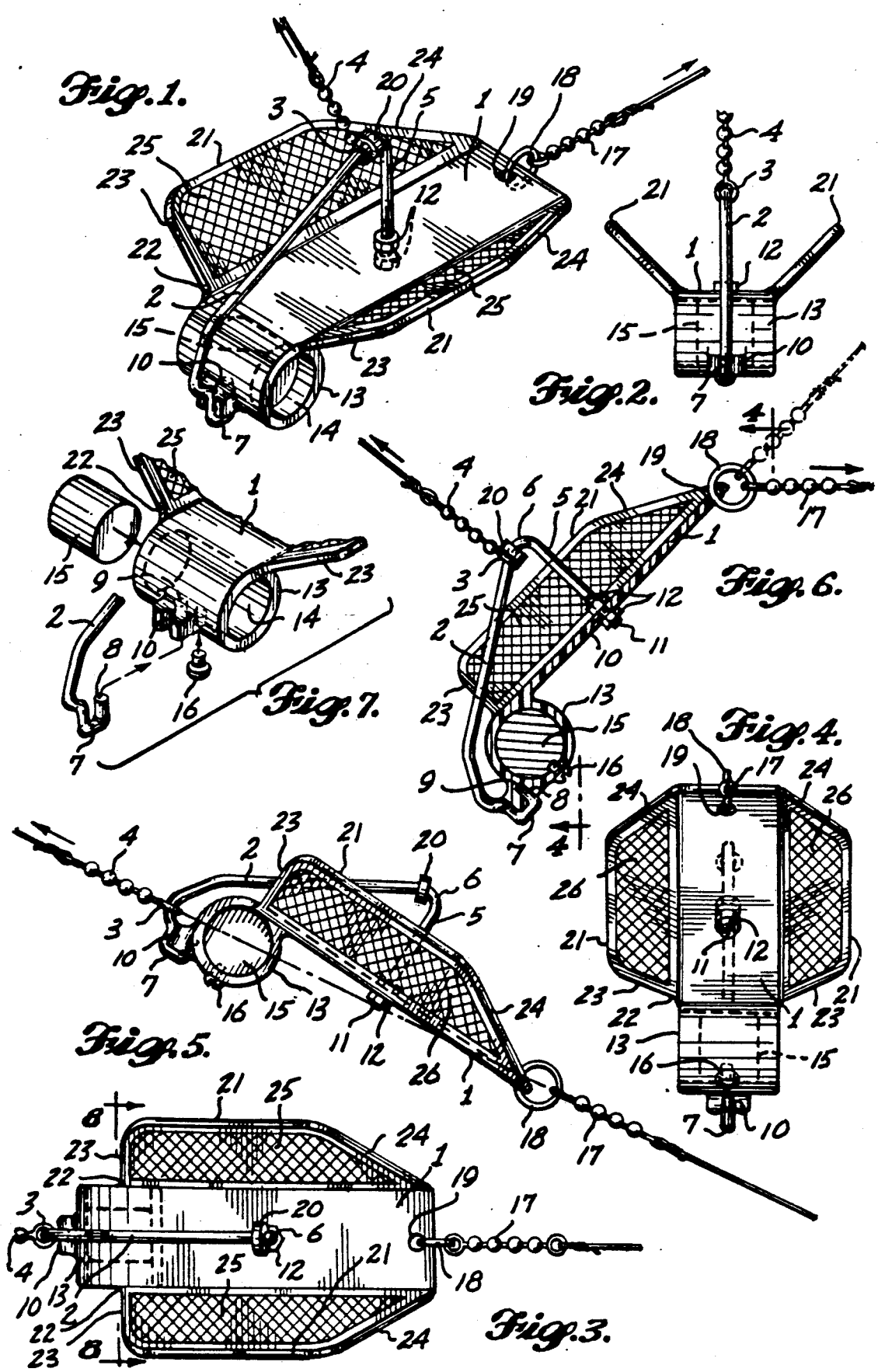

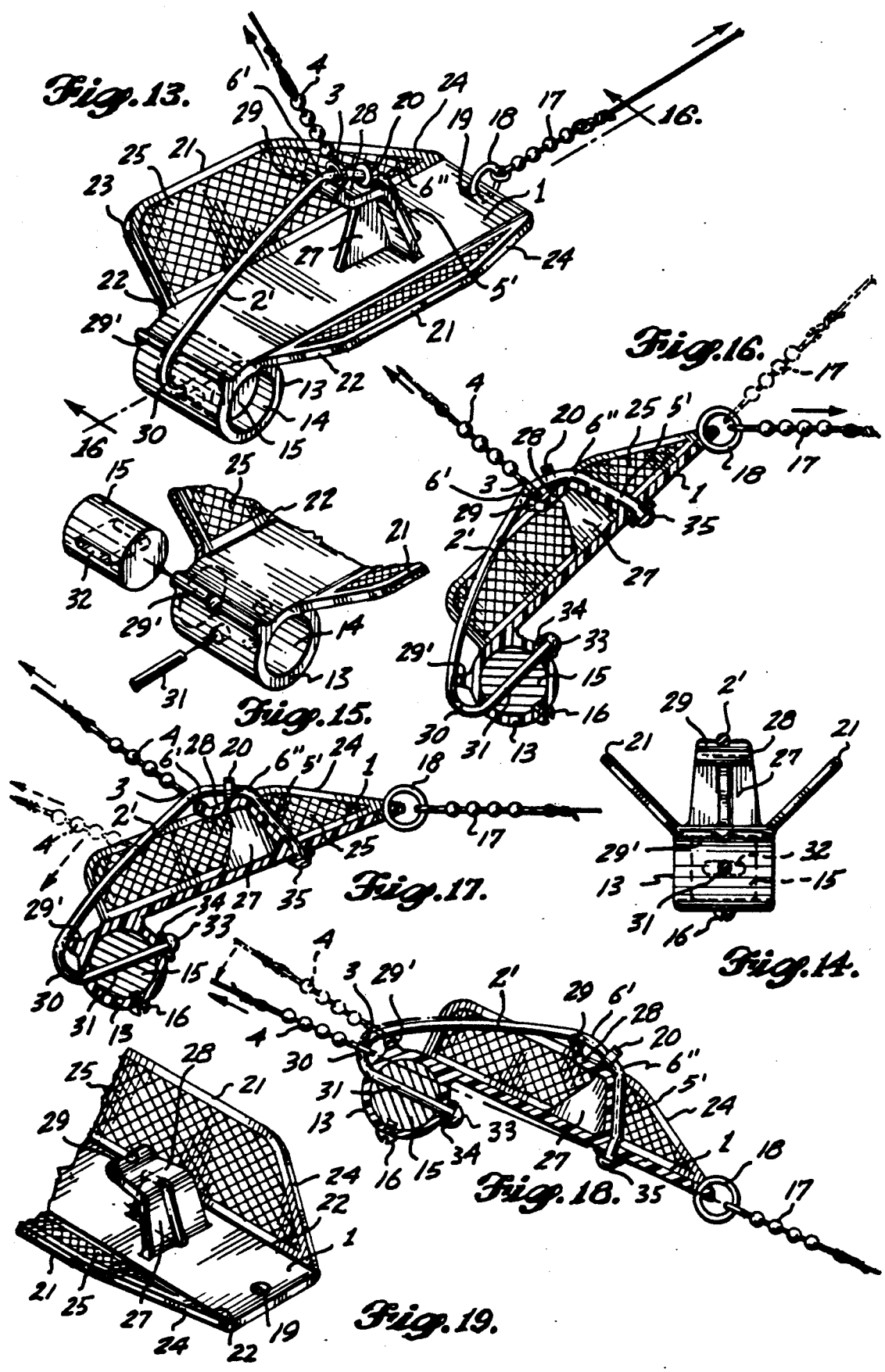

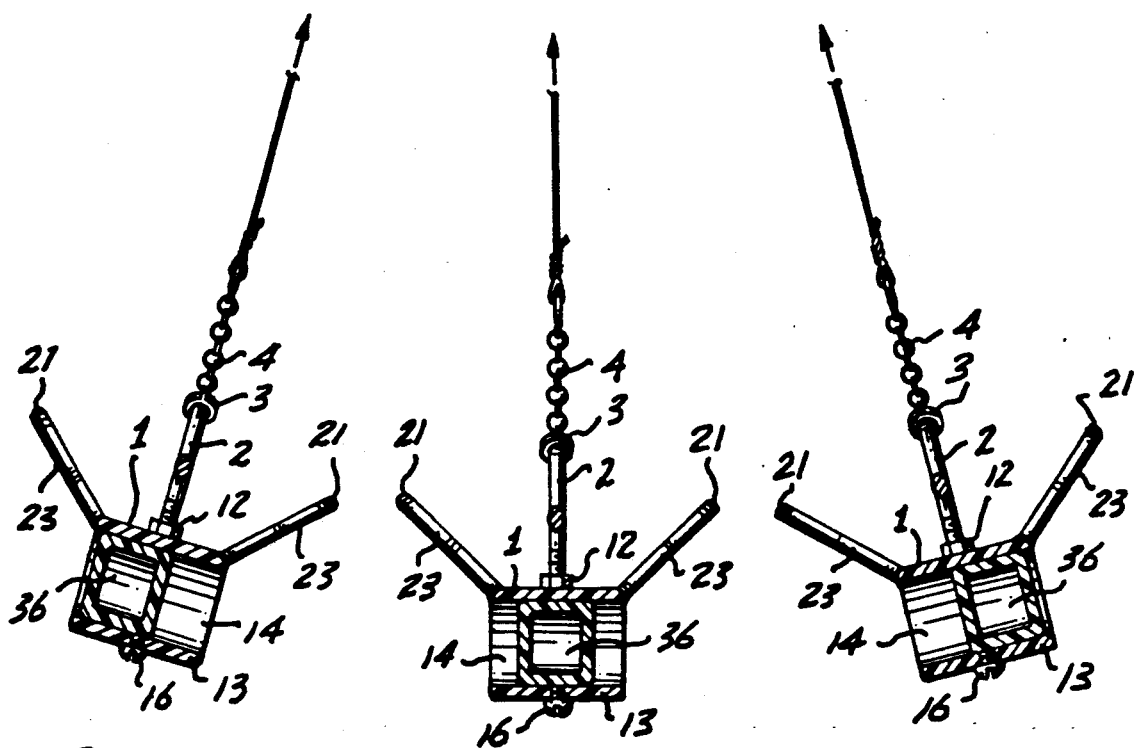

TRIPANEL HYDRODYNAMIC DEPRESSOR FOR FISHING LINES

BACKGROUND OF THE INVENTION

1. Field of the Invention

The present invention relates to hydrodynamic depressors or tuggers for fishing lines used to divert the trailing end of a fishing line and its hook, lure or bait attachments such as to submerge the trailing end of a trolled fishing line and its attachments to a desired depth or to draw such line end and its attachments into a current.

2. Prior Art

Collins U.S. Pat. No. 3,466,787, issued Sep. 16, 1969, and Zaharis U.S. Pat. No. 3,708,904, issued Jan. 9, 1973 both show depressors for fishing lines, but these patents do not show any provision for offsetting the course of such depressors laterally from the course of the leading end of the fishing line, nor do they have any provision for attracting fish.

Heili U.S. Pat. No. 3,863,382, issued Feb. 4, 1975, shows a fishing line depressor having a bail 14 to which a fishing line is attached and, as shown in FIG. 3 and described at column 4, lines 43 to 46, this bail can be displaced from the solid-line position shown in FIG. 3 to either of the dotted-line positions to cause the diving plane to move to the left or to the right when the depressor is in operation to provide some lateral displacement of the trolling line. Presumably the rod 2 of the Collins patent depressor or the bar 14 of the Zaharis patent depressor could be displaced in a similar manner, but how effective such an expedient would be to effect lateral displacement of the trolling line is unknown.

The depressors of the Collins and Zaharis patents do not have any provision for stabilizing the depressor to cause it to maintain a steady course.

Louthan U.S. Pat. No. 2,247,583, issued Jul. 1, 1941, and Louthan U.S. Pat. No. 2,273,209, issued Feb. 17, 1942 show fishing line depressors having ovate or egg-shaped plate bodies which are dished and have tail guide fins intended to hold the depressor on a straight course so that it will not wobble from side to side.

The Shaw U.S. Pat. No. 3,831,308, issued Aug. 27, 1974, shows a fishing line depressor having two pairs of wings projecting laterally oppositely from a body including relatively large forward wings and relatively small rearward wings. As shown in FIG. 3, the larger wings are set both at a dihedral angle and at a negative angle of incidence, while the smaller wings do not have a dihedral angle but are set at a negative angle of incidence when the fishing line 10 is attached as shown in FIG. 7 to cause the depressor to descend. When the fishing line is reversed, as shown in FIG. 8, the angles of incidence of the wings are positive to effect surfacing of the depressor.

In Holstein U.S. Pat. No. 4,161,841, issued Jul. 24, 1979, a fishing line depressor is shown which has its forward wing tips bent upward and its rearward wing tips bent downward to form spoilers that are stated to cause the depressor ultimately to rise and fall, whereas a plate 27 on the front end of the device in conjunction with a rear downwardly-turned spoiler causes the device to oscillate from right to left.

SUMMARY OF THE INVENTION

It is a principal object of the present invention to provide a hydrodynamic depressor for trolled fishing lines having a body shape that will stabilize the depressor so that it will travel in a steady course.

Another object is to provide such a depressor for fishing lines which will provide a glitter to attract fish without increasing the profile drag of the depressor.

A further object is to provide an adjustment that can be set readily to trim the depressor to travel a course offset to one side or the other from the course of the leading end of a trolled fishing line.

It is also an object to provide a depressor for a fishing line that can be set to provide a downward hydrodynamic force but which can be tripped when a pull is exerted on the bait leader to effect a hydrodynamic lifting force.

In accomplishing the last-mentioned object, it is an object to enable the fishing line to be connected to the depressor so that the position of the connection can be controlled by the fisherman to maintain the depressor either in the descending attitude or in the ascending attitude.

The foregoing objects can be accomplished by a hydrodynamic depressor for a fishing line having a plate body composed of a central longitudinal panel flanked by side panels at dihedral angles to the central panel and having a weight housed in a crossbore provided at the leading end of the body which is shiftable transversely to different trimming positions. The body panels have crinkled upper and lower light-reflective surfaces to reflect light in glittering fashion for attracting fish.

An additional object is to provide a hydrodynamic tugger that can operate to displace or draw the trailing end of a fishing line and its hook, lure or bait attachments into a current, such as a stream, river or tidal current.

The last-mentioned object can be accomplished by a device having a construction similar to that stated above but which can have a provision for providing buoyancy for the tugger.

BRIEF DESCRIPTION OF THE DRAWINGS

FIG. 1 is a top perspective of the depressor.

FIG. 2 is a front elevation of the depressor.

FIG. 3 is a top plan of the depressor; and FIG. 4 is a rear elevation of the depressor in downward and forward inclined attitude as seen from line 4—4 of FIG. 6.

FIG. 5 is a side elevation of the depressor in ascending attitude; and FIG. 6 is a longitudinal vertical section through the depressor shown in downwardly and forwardly inclined attitude.

FIG. 7 is a fragmentary top perspective of the leading portion of the depressor showing parts in exploded relationship.

FIG. 13 is a top perspective of a form of depressor modified from that shown in FIG. 1.

FIG. 14 is a front elevation of the depressor shown in FIG. 13 with parts broken away.

FIG. 15 is a fragmentary top perspective of the leading portion of the depressor shown in FIG. 13 with parts shown in exploded relationship.

FIG. 16 is a vertical longitudinal section through the depressor shown in FIG. 13 in steeply inclined downwardly and forwardly attitude; FIG. 17 is a similar view of the depressor in a less steeply inclined attitude; and FIG. 18 is a similar view with the depressor in forwardly and upwardly tilted attitude.

FIG. 19 is a fragmentary top perspective of the aft portion of the depressor shown in FIG. 13 with parts omitted and parts broken away.

FIGS. 20, 20A and 20B are vertical transverse sections through the leading portion of a tugger taken along a line such as line 8—8 of FIG. 3.

DETAILED DESCRIPTION

Figure 8A:
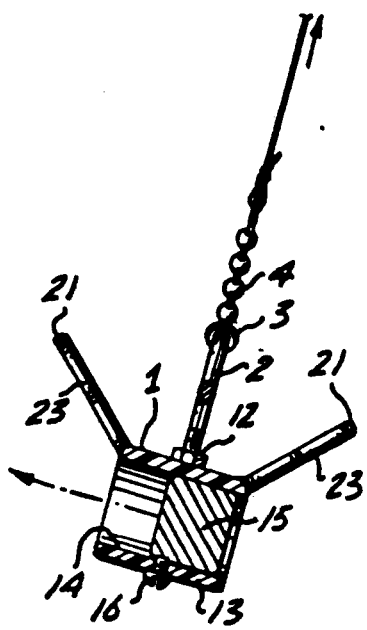
FIGS. 8, 8A and 8B are vertical transverse sections through the leading portion of the depressor taken along line 8—8 of FIG. 3 showing the depressor in different trimmed positions.

The hydrodynamic tugger or depressor has a generally horizontal plate body 1 carrying a guide rod 2 extending fore-and-aft of the body for guiding a ring 3 formed by the eye of a conventional fishing line swivel connector or swiveling bead chain attached to the end of a fishing line 4 for sliding fore-and-aft relative to the depressor between a rearward position shown in FIG. 6 and a forward position shown in FIG. 5.

The upright aft portion 5 of the guide rod 2 is connected by a bend 6 to the downwardly sloping forward portion of the guide rod, which bend preferably makes an acute angle. The forward end of the guide rod has a hook 7 forming an upwardly-directed tip 8 engageable in a socket 9 provided in the forward end of the depressor body. The side of the hook 7 opposite the tip 8 may fit laterally into a groove 10 formed between lugs projecting forward from the body, as shown best in FIG. 7.

The rearward end 11 of the guide rod 2 may be inserted downward through a hole in the plate body 1 of the depressor and secured in place by nuts 12. The end portion of the upright rod part 5 can be threaded over a sufficient length to accommodate locknuts 12 on opposite sides of the plate body to secure the rearward guide rod end to the body.

A housing 13 is carried by the forward portion of the body 1, preferably close beneath such forward portion to minimize profile drag of the tugger. Such housing has a hole 14 preferably in the form of a cylindrical bore extending through the housing with its axis disposed transversely of the guide rod 2 and the fishing line 4. The specific gravity of the tugger can be increased by a sinker or weight 15, preferably of cylindrical shape complemental to the bore 14, receivable in such bore, as shown in FIGS. 1 through 7. Such weight can be shifted axially in such bore to different positions laterally relative to the fishing line, or asymmetrically of the guide rod 2, to trim the depressor.

Figure 8:
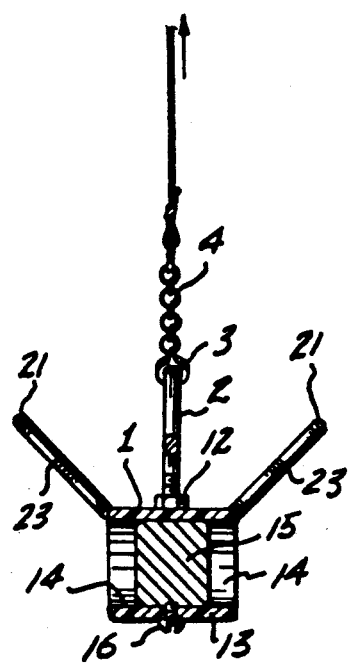
Figure 8B:
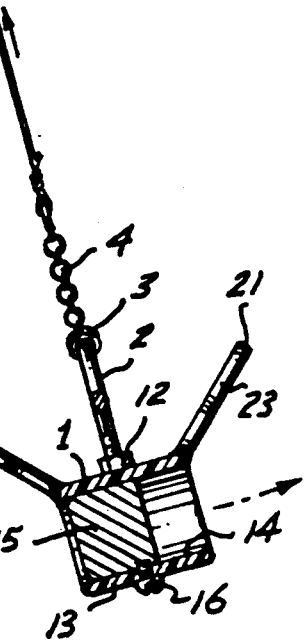

As shown in FIG. 8, when the weight 15 is located centrally, the depressor will travel toward the viewer in a line in the same vertical plane as the course of travel of the leading end of the fishing line 4. When the weight 15 is shifted to port in the bore 14, however, as shown in FIG. 8A, the depressor will be trimmed so that it will travel toward the viewer along a course offset transversely of the fishing line to starboard from the course along which the leading end of the fishing line travels when the line is being trolled. Conversely, by shifting the weight 15 to starboard in the bore 14, as shown in FIG. 8B, the course of travel of the depressor toward the viewer will be offset transversely of the fishing line to port from the course of travel of the leading end of the fishing line.

Such ability to trim the depressor by locating weight 15 asymmetrically of the guide rod 2 will enable the depressor to be trimmed for establishing a course that will not conflict with courses of other depressors trolled from the same boat. By separating the courses of the depressors, their respective fishing lines will not become tangled. When the weight 15 has been shifted to the desired location in the housing 13 it may be secured in such position by tightening a setscrew 16 extending through a hole in the housing 13 for engagement with the weight 15.

While the guide rod 2 for the fishing line attaching ring 3 extends alongside the forward portion of the depressor body, one or more hooks and bait or lures will be attached by a leader 17 to the aft portion of the body. As shown in FIGS. 1, 5 and 6, such leader is attached to the depressor body by a ring 18 extending through an aperture 19 in the trailing portion of the body. As in the case of the fishing line, it is desirable that the leader include a swiveling bead chain portion attached to the ring 18 to prevent the leader from being twisted by the action of being pulled through the water.

Rearward sliding of the fishing line attaching ring 3 along the guide rod 2 may be limited by a collar 20 fitting closely on the guide rod, preferably at a location immediately forward of the guide rod bend 6.

It is desirable to provide a depressor that will follow steadily the course for which it is trimmed instead of wandering or darting into the path being traveled by an adjacent depressor. The body 1 may include a substantially flat rectangular central panel elongated fore-and-aft. To stabilize or steady the course of the depressor, the opposite longitudinal edges of the central panel extending generally parallel to the course of travel of the depressor are flanked by side panels 21. As shown in FIG. 1, the transverse width of each side panel may be substantially equal to the transverse width of the central panel, but such width relationship is not necessary. The angle between the outer margin of each side panel and its leading edge 22 is approximately 90 degrees, and the dihedral angle between each side panel and the central panel should be within the range of 110 degrees to 160 degrees, preferably being of the order of 135 degrees. Also it is preferred that the transverse widths of the side panels be approximately equal and that the dihedral angles between the two side panels and the central panel be substantially equal so as to cause the depressor to follow a straight course in the same vertical plane as the course of the leading end of the fishing line 4 if the weight 15 is centered in the bore 14 as shown in FIG. 8.

If the tugger is unsymmetrical, such as the dihedral angles between the side panels 21 and the central panel being different, or the side panels being of different transverse widths, however, the tugger will tend to follow a course offset toward the side of the tugger where the dihedral angle between the side panel and the central panel is smaller or the width of the side panel is less. Thus the size of the dihedral angles between the side panels and the central panel and the widths of the side panels can be selected as an alternative to locating the weight 15 offset from the longitudinal vertical central plane of the depressor, or to supplement the action of locating the weight 15 laterally out of the central position, to provide a greater offset of the course of the depressor from the course traveled by the leading end of the fishing line 4.

In order to decrease profile drag of the depressor, it is desirable for the trailing outer corners of the side panels 21 to be clipped, providing rearwardly and inwardly inclined trailing edges 24.

An advantage of the side panels 21 being disposed at dihedral angles to the central panel is that they may be surfaced to provide a reflected-light glitter for attracting fish. In FIGS. 1 and 3, the upper surfaces 25 of the side panels 21 are shown as being crinkled or ruffled to scatter light reflected from them. FIGS. 4 and 5 show that the undersurface of each side panel is crinkled or ruffled to provide scattered reflected light. The result of such scattered reflected light is to provide a glitter emanating from the surfaces of the side panels. The angularity of the side panels relative to the central panel causes such glitter to be projected to a considerable extent sidewise for attracting the attention of fish at approximately the same depth as the depressor instead of any glitter being entirely upward. Such sidewise direction of the glitter is particularly effected if the depressor is canted as shown in FIGS. 8A and 8B.

The general shape of the tugger including the side panels 21 bent upwardly from the central panel and the disposition of the housing 13 close beneath the leading end of the central panel provides a profile as shown in FIG. 2 which is somewhat similar to the profile of a fish and, when viewed from the side as in FIG. 5, the tugger also generally resembles a fish. Consequently, the light-reflecting tugger serves as an attraction for fish in addition to bait or lures attached to the leader 17 without providing an additional flasher component to the gear.

Figure 9:
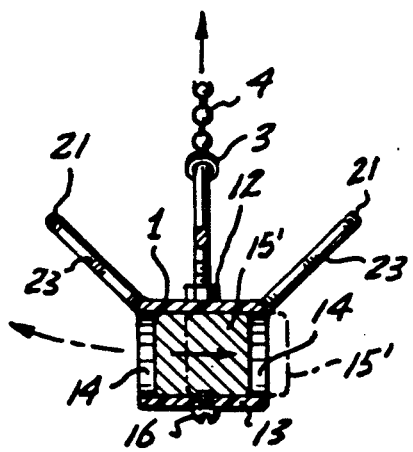
FIG. 9 is a view similar to FIG. 8 but showing the depressor as having a larger weight.
Figure 10:
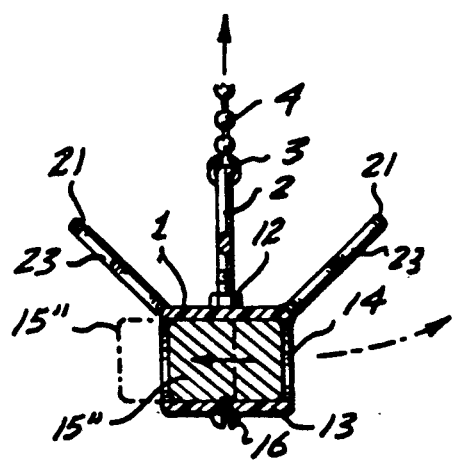
FIG. 10 is a further similar view of the depressor having a still larger weight.
Figure 12:
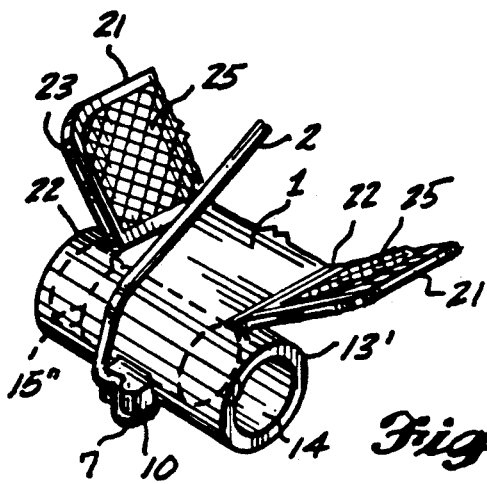
FIG. 12 is a fragmentary top perspective of the leading portion of such depressor.
Figure 11:
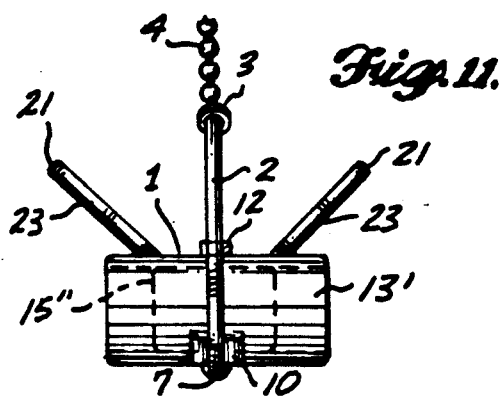
FIG. 11 is a front elevation of a depressor similar to that shown in FIG. 2 but having a larger weight and a longer crossbore housing such weight.

In the modified forms of depressor shown in FIG. 9, in FIG. 10 and in FIGS. 11 and 12, the trimming weight mechanism is somewhat different from that shown in FIGS. 1 to 8. In FIG. 9 and FIG. 10, the size of the housing 13 and the crossbore 14 is the same as that shown in FIGS. 1 to 8, but the weight 15' shown in FIG. is longer than the weight 15 shown in FIGS. 1 to 8, and the weight 15" shown in FIG. 10 is even longer than the weight 15' shown in FIG. 9. Since the weights 15' in FIG. 9 and 15' in FIG. 10 are larger than the weight 15 shown in FIGS. 1 to 8, the same trimming effect can be obtained by shifting the weight in the bore transversely to a lesser extent.

Because the weights shown in FIGS. 9 and 10 are longer, shifting them to their extreme offset positions will cause the weights to protrude to a lesser extent in FIG. 9 and to a greater extent in FIG. 10 beyond the end of the housing crossbore. Such protrusion, however, does not alter the performance of the depressor appreciably except to increase the trimming effect.

If it is preferred to be able to accommodate a longer weight such as the weight 15" shown in FIG. 10 and to be able to shift it relative to the housing to an extreme offset position without the weight end protruding beyond the housing bore, the length or axial extent of the housing can be increased such as shown in the housing 13' in FIGS. 11 and 12.

Utilization of a larger weight or sinker would increase the depth to which the depressor would descend without altering the structure or size of the depressor as a whole. The depth to which a selected depressor would descend is determined by the velocity of the water relative to the depressor which is a function of trolling speed and current direction and speed. The length of fishing line would also affect the angle of attack of the depressor body.

For example, if the velocity of the water relative to the depressor body were five knots, the length of the fishing line were fifty feet and the weight of the sinker 15 were one ounce, the travel of the depressor might stabilize at a depth of twenty feet. If the weight 15" shown in FIG. 11 were three times as long as the weight 15 shown in FIG. 8, so that its weight was three ounces, the depressor might stabilize at a depth of forty feet if the relative velocity of the depressor and the water were the same and the length of fishing line were the same. Being able to provide a depressor that would stabilize its travel at different depths merely by changing the weight of the sinker has the advantage of providing a versatile type of gear without the necessity of acquiring several depressors of different size best adapted for use under different fishing conditions.

In the modified depressor shown in FIGS. 13 to 19, the tripanel body 1, the trimming weight 15 and the weight housing 13 are essentially the same as shown in the depressor illustrated in FIGS. 1 to 8, inclusive. In this form of depressor, however, the guide rod 2' for the fishing line attaching ring 3 and the structure for mounting such guide rod on the body have been changed to some extent. In this form of depressor, a post 27 of T-shaped cross section upstands from the upper surface of the body central panel generally centrally between its ends and generally centrally between its side edges. A saddle 28 mounted on the upper end of the post includes a rib 29 elongated transversely of the guide rod 2' and notched to receive the guide rod which crosses the upper end of the post. The forward portion of the fore-and-aft guide rod normally bears on a rib 29' projecting from the upper portion of the housing 13, as shown in FIGS. 15, 16 and 17. Such rib is elongated transversely of the guide rod 2' and may also have a notch for receiving the guide rod. Rearward travel of the fishing line attaching ring 3 may be limited by engagement with a stop collar 20 mounted on the guide rod 2' behind the rib 29 of saddle 28.

The construction for anchoring the front end portion of the guide rod 2' is different in the modification of FIGS. 13 to 19 than in the depressor shown in FIGS. 1 to 8. In such modification, the portion of the guide rod forward of the rib 29' has a return bend 30 forming a rearwardly-directed tip portion 31. Such tip portion extends through an aperture in the forward side of the housing 13 and passes through a diametral slot 32 in the trimming weight 15, as shown in FIGS. 15, 16 and 17. Rearwardly of the trimming weight housing 13, the end of the guide rod can be enlarged to retain tip 31 in the housing such as by being upset to form a knob or rivet head 33 or a ferrule may be crimped on the end of the guide rod.

Such head can be cushioned with respect to the trimming weight casing 13 by a resilient washer 34 of elastomeric material. Provision of such a cushion will enable the tip 31 to move lengthwise to some extent to enable the rod 2' to be displaced forward slightly away from the rib 29'. Such lengthwise displacement of the rod, however, will not enable the rod to be deflected transversely of its length away from the rib 29 or 29' sufficiently to enable the ring 3 to slide along it past such a rib. Consequently, it is necessary for the rod 2' to be made of resilient material such as nylon which will enable it to be deflected away from a rib 29 or 29' by sufficient wedging pressure of the ring 3 between the guide rod and rib and to return substantially into contact with the rib after the ring 3 has slid past the rib.

In order to fit the saddle 28 more closely, the guide rod 2' may have in it two adjacent bends 6' and 6" on opposite sides, respectively, of the stop collar 20 instead of having a single sharper bend 6, as shown in the depressor of FIGS. 1 to 8, inclusive. The rearward portion 5' of the guide rod may lie close alongside the back of the post 27, as shown in FIGS. 15, 16 and 17. The rearward end of the guide rod extends through an aperture in the base 1 and is enlarged to anchor such rear end to the body. As discussed in connection with the forward end of rod 2', the enlargement may be formed by upsetting to form a knob or rivet head 35 as shown in FIGS. 16, 17 and 18 or by crimping a ferule on the rod end. If the resilient material of which rod 2' is made is nylon, which is a thermoplastic material, such upsetting can be effected by warming the nylon until it is moldable and then upsetting it and molding it by pressure. A resilient washer may be provided between the rod head 35 and the body 1, if desired, like the washer 34 on the forward end of the rod 2' as discussed above.

The fishing line depressors of the present invention, like prior art fishing line depressors referred to above, are arranged to assume either a descending attitude such as shown in FIGS. 2 and 16 or an ascending attitude such as shown in FIGS. 5 and 18, or even a less steep descending attitude as shown in FIG. 17. Such change in attitude is effected by shifting fore-and-aft the point of attachment of the fishing line to the depressor. To effect steep descent of the depressor, the fishing line is attached to the depressor generally centrally fore-and-aft, whereas the depressor is shifted to ascending attitude if the point of attachment of the fishing line to the depressor is shifted forward as far as possible.

When it is desired to maneuver the attachments to the depressor to fishing depth, the fishing line connecting ring 3 is slid rearwardly along the guide rod 2 or 2' usually to the fullest possible extent. In such case, the connecting ring 3 would be engaged with the stop collar 20 as shown in FIG. 4 or be lodged rearwardly of the rib 29 of saddle 28 as shown in FIG. 16. In such attitude, the body of the depressor may be generally perpendicular to the adjacent portion of the fishing line 4.

If a jerk is exerted on the fish hook leader 17 in the direction indicated by the arrows in FIGS. 6 and 16 by a fish striking the bait associated with the hook, or perhaps even by a pull resulting from the hook becoming snagged with seaweed, the rear portion of the depressor body will be swung downward about the fishing line connecting ring 3, and the forward portion of the depressor will be swung upward toward the position shown in FIGS. 5 and 18. The rearward pull of the fish or seaweed on the depressor and the forward pull exerted by the fishing line will cause the connecting ring 3 to slide along the guide rod 2 to the bent forward end portion of the guide rod as shown in FIGS. 5 and 18.

In the case of the depressor shown in FIGS. 13 to 19, the stretching forces exerted by the fishing line 4 and the leader 17 on the depressor will wedge ring 3 between guide rod 2' and rib 29 to force the rod 2' locally away from rib 29 sufficiently so that the ring can slide past such rib, whereupon the resilience of the rod 2' will return the guide rod substantially into contact with rib 29.

As the ring 3 slides forward along the guide rod from the position of FIG. 6 or FIG. 16 to the position of FIG. 5 or FIG. 18, the angle of attack of the depressor body 1 will change from negative to positive so that the hydrodynamic force acting on the depressor body will urge it to ascend. In such attitude of the depressor, the housing 13 for the sinker will not cause much drag because it is located close beneath the leading portion of the depressor body. Consequently, a hooked fish will be urged smoothly to the surface of the water, whereas the action of the water on a weight projecting a substantial distance below the plate body of a depressor will swing from side to side and cause the depressor to bounce around instead of moving smoothly through the water.

A further advantage of the type of depressor shown in FIGS. 13 to 19 is that the stretching action of the pull on the fishing line and on the leader 17 will not only wedge the ring 3 along guide rod 2' past the rearward rib 29 but also past the forward rib 29' and through the broken-line position shown in FIG. 18 to the solid-line position shown in that figure in which the ring is lodged in the reverse bend 30 between the rib 29' and the housing 13. The resiliency of the rod 2' will retain the ring in this location despite slight reversal in force which may occur temporarily tending to move ring 3 rearward, so that this construction also will contribute to maintaining the depressor body in its positive angle of attack ascending condition. When the travel of the ascending depressor is smooth instead of the depressor bouncing around, the fisherman has a better feel for playing the fish, and virtual elimination of jerking action of the depressor greatly reduces the possibility of the fishhook being dislodged and pulled out of the mouth of the fish or of the leader 17 breaking.

The construction of the depressor shown in FIGS. 13 to 19 provides reasonable assurance that the depressor will be retained either in the steeply descending attitude shown in FIG. 6 or in the ascending attitude shown in FIG. 18 without the connecting ring 3 sliding uncontrollably along the guide rod, as shown in broken lines in FIG. 17.

If the righting force has been exerted on the depressor by a fish striking the hook, it is desirable for the depressor to maintain the upwardly-inclined positive angle of attack attitude of its body as shown in FIGS. 5 and 18, so that the depressor will surface to facilitate landing of the fish. On the other hand, if, as mentioned above, the righting force has been exerted on the depressor by the trailing hook snagging seaweed, it may be desirable to submerge the depressor again to fishing depth without reeling the depressor in to the boat. Under such circumstances, it may be possible to reset the depressor from the tripped condition shown in FIGS. 5 and 18 to the descending attitude shown in FIGS. 6 and 16.

If the fishing line 4 is reeled in sufficiently so that the fisherman can see that tripping of the depressor has been effected by seaweed rather than by a fish, the fisherman may be able to dislodge the seaweed by manipulating the fishing pole. At this time the fisherman may be able to see that the bait is intact and the fishing line attachments are in proper order and not tangled.

The resilience of the washer 34 or the resilience of the guide rod or both will maintain the connecting ring 3 in the position shown in FIG. 18 trapped by the rib 29 unless the connecting ring is freed from this position by intentional manipulation of the fishing rod by the fisherman. By jerking the tip of the fishing rod upward, the fisherman may be able to snap the connecting ring 3 past the rib 29' to slide rearwardly along the guide rod 2' and past the other retaining rib 29 carried by the saddle 28 into depressor-descending condition. Such ability to reset the gear to resume fishing can save much fishing time. In fact, provision of the latching ribs 29 and 29' enables the fisherman to control the attitude of the depressor voluntarily at all times rather than having the depressor shift inadvertently from the steeply descending attitude shown in FIG. 16 to the ascending attitude shown in FIG. 18 or vice versa.

While utilization of the tugger as a fishing line depressor has been discussed above, a device of substantially the same construction can be utilized as a displacer for displacing the trailing end of a fishing line and its attachments to a greater or lesser distance into a current, such as the current of a stream or river or a tidal current. Such a displacer is shown in FIG. 20 as having a float 36 received within the bore 14 of the housing 13. Such float is of cylindrical shape of a size completemental to the bore 14 so that it can be fitted into and slid along such bore. The only difference is that the float 36 is hollow so that it is buoyant, instead of being solid to serve as a sinker.

While a tugger 1 having a float 36 in the bore 14 can be trolled with a negative angle of attack such as shown in FIG. 6 and FIG. 16, the float will provide sufficient buoyancy for the tugger as a whole so that it will not descend to a substantial depth for fishing. Instead, it will follow a course near the surface of the water.

If the float 36 is located in an asymmetrical position offset transversely of the fishing line and the guide rod 2 or 2' to one side as shown in FIG. 20A or to the other side as shown in FIG. 20B, the tugger will serve as a displacer to displace the trailing end of the fishing line in a current by drawing it into the current when the float is placed appropriately in the bore 14. Such a displacer can be used in stream fishing or river fishing when the fisherman is on or near the bank of the stream or river, or can be used by a fisherman standing on the shore or a jetty adjacent to tidal water in which a tidal current is flowing.

As the fisherman pays out line, the tugger will serve as a displacer to draw the tugger and the trailing end of the fishing line farther out into the current. For stream fishing or river fishing, it may be desirable to utilize a tugger of smaller size, but otherwise of substantially the same construction, as utilized for the tugger serving as a depressor. For use in a current as a displacer, the tugger could be placed in the current initially by casting, if the fisherman were located at one side of the current.

I claim:

1. A hydrodynamic tugger for a fishing line comprising a generally horizontal plate body, means for connecting said body to the fishing line including a guide rod carried by said plate body and extending fore and aft, a ring carried by the end of the fishing line adjacent to said body and having sliding engagement with said guide rod, and a rib carried by said body adjacent to said guide rod, elongated transversely of said guide rod and engageable by said ring sliding along said guide rod for deterring movement of said ring past said rib, but said guide rod being sufficiently yieldable relative to said rib to enable said ring to be forced along said guide rod past said rib.

2. The tugger defined in claim 1, in which the guide rod is resiliently flexible.

3. The tugger defined in claim 2, in which the guide rod is nylon.

4. The tugger defined in claim 1, including a post upstanding from the plate body generally centrally thereof beneath the guide rod, and the rib being carried by the upper end of said post.

5. The tugger defined in claim 1, in which the rib is carried by the forward portion of the plate body and the forward portion of the guide rod has a bend forward of the rib engageable by the ring when it has been slid forward along the guide rod past the rib.

6. A hydrodynamic tugger for a fishing line comprising a generally horizontal plate body composed of a substantially flat central panel and two substantially flat side panels flanking opposite edges of said central panel and disposed at dihedral angles relative to said central panel, a housing carried by said central panel close beneath its forward portion and having a hole therein disposed with its length extending transversely of the fishing line, a guide rod extending fore and aft, having its forward end attached to said housing and its rearward end attached to said central panel, a fishing line connection including a connecting ring slidable along said guide rod, a rib carried by said housing adjacent to said guide rod for deterring movement of said connecting ring along said guide rod past said rib but said guide rod being sufficiently yieldable to enable said connecting ring to be forced along said guide rod past said rib, and specific gravity altering means complemental to said hole in said housing, received in said hole and shiftable relative to said housing transversely of the fishing line to dispose said specific gravity altering means asymmetrically relative to said guide rod for trimming the tugger to affect its course.

7. The tugger defined in claim 6, in which the tugger is a depressor, the fishing line is a trolling line, the specific gravity altering means includes a sinker, and the shifting of the specific gravity altering means trims the depressor to travel along a course offset transversely of the fishing line from the course traveled by the leading end of the trolled fishing line.

* * * * *